United States Patent
Ariffin et al.

(10) Patent No.: US 8,184,808 B2
(45) Date of Patent: May 22, 2012

(54) CHAOTIC ASYMMETRIC ENCRYPTION PROCESS FOR DATA SECURITY

(75) Inventors: Muhammad Rezal Kamel Ariffin, Selangor (MY); Kamel Ariffin Mohd Atan, Selangor (MY)

(73) Assignee: Universiti Putra Malaysia, Selangor (MY)

( * ) Notice: Subject to any disclaimer, the term of this patent is extended or adjusted under 35 U.S.C. 154(b) by 675 days.

(21) Appl. No.: 12/329,348

(22) Filed: Dec. 5, 2008

(65) Prior Publication Data

US 2010/0034377 A1 Feb. 11, 2010

(30) Foreign Application Priority Data

Aug. 8, 2008 (MY) ............................... PI 20083007

(51) Int. Cl.
*H04L 9/00* (2006.01)
(52) U.S. Cl. .............................. 380/46; 380/44; 380/277
(58) Field of Classification Search ...................... 380/46
See application file for complete search history.

(56) References Cited

U.S. PATENT DOCUMENTS

| | | | |
|---|---|---|---|
| 5,201,000 A | | 4/1993 | Matyas et al. |
| 6,014,445 A * | | 1/2000 | Kohda et al. ..................... 380/28 |
| 6,792,111 B1 * | | 9/2004 | Italia et al. ..................... 380/263 |
| 7,218,733 B2 * | | 5/2007 | Li et al. ............................. 380/28 |
| 7,912,212 B2 * | | 3/2011 | Alpcan et al. .................... 380/28 |
| 2002/0018566 A1 | | 2/2002 | Kawatsura et al. |
| 2002/0076042 A1 | | 6/2002 | Sandhu et al. |
| 2004/0158715 A1 | | 8/2004 | Peyravian et al. |
| 2007/0064935 A1 | | 3/2007 | Ben-Yehuda |
| 2007/0199071 A1 | | 8/2007 | Callas |

FOREIGN PATENT DOCUMENTS

| | | |
|---|---|---|
| EP | 1 326 363 A1 | 9/2003 |
| EP | 1 420 542 A1 | 5/2004 |

OTHER PUBLICATIONS

J.M. Amigó et al. / Physics Letters A 366 (2007) pp. 211-216, year 2007.*
Malaysian Office Action for PI 20083007, mailed Feb. 14, 2011.
Andrea Gerosa et al., "A fully integrated chaotic system for the generation of truly random numbers", IEEE Transactions on Circuits and Systems I: Fundamental Theory and Applications, vol. 49 Issue: 7, pp. 993-1000, 2002.
C.E. Shannon, "Communication Theory of Secrecy Systems" 1949.
Whitfield Diffie et al., New direction in cryptography.

* cited by examiner

*Primary Examiner* — David Y Jung
(74) *Attorney, Agent, or Firm* — Lowe, Hauptman, Ham & Berner, LLP

(57) ABSTRACT

Disclosed is a method and apparatus for a chaotic asymmetric encryption system that is based on a mathematically proven chaotic dynamical system, the ergodic property of chaotic maps, conventional Diffie-Hellman key exchange procedure, a modified Diffie-Hellman key exchange procedure and a public key which is any number that could be chosen from the interval 0,1.

9 Claims, 4 Drawing Sheets

CHAOTIC ASYMMETRIC ENCRYPTION PROCESS FOR DATA SECURITY

RELATED APPLICATIONS

The present application is based on, and claims priority from, Malaysian Application Number PI 20083007, filed Aug. 8, 2008, the disclosure of which is hereby incorporated by reference herein in its entirety.

TECHNICAL FIELD

The present invention is generally related to a cryptography system, and more particularly, to a chaotic asymmetric encryption system.

BACKGROUND TO THE INVENTION

A cryptographic system is a system for sending a message from a sender to a receiver over a medium so that the message is "secure", that is, so that only the intended receiver can recover the message. A cryptographic system (or cryptosystem) converts a message, referred to as "plaintext" into an encrypted format, referred to as "ciphertext." The encryption is accomplished by manipulating or transforming the message using a "cipher key" or keys. The receiver "decrypts" the message, that is, converts it from ciphertext to plaintext, by reversing the manipulation or transformation process using the cipher key or keys. So long as only the sender and receiver have knowledge of the cipher key, such an encrypted transmission is secure.

A "classical" cryptosystem is a cryptosystem in which the enciphering information can be used to determine the deciphering information. To provide security, a classical cryptosystem requires that the enciphering key be kept secret and provided to users of the system over secure channels. Secure channels, such as secret couriers, secure telephone transmission lines, or the like, are often impractical and expensive.

A system that eliminates the difficulties of exchanging a secure enciphering key is known as "public key encryption." By definition, a public key cryptosystem has the property that someone who knows only how to encipher a message cannot use the enciphering key to find the deciphering key without a prohibitively lengthy computation. An enciphering function is chosen so that once an enciphering key is known, the enciphering function is relatively easy to compute. However, the inverse of the encrypting transformation function is difficult, or computationally infeasible, to compute. Such a function is referred to as a "one way function" or as a "trap door function." In a public key cryptosystem, certain information relating to the keys is public. This information can be, and often is, published or transmitted in a non-secure manner. Also, certain information relating to the keys is private. This information may be distributed over a secure channel to protect its privacy (or may be created by a local user to ensure privacy).

Cryptography is generally acknowledged as the best method of data protection against passive and active fraud. Recent developments in the design of conventional encryption algorithms are disclosed in "A fully integrated chaotic system for the generation of truly random numbers", IEEE Transactions on Circuits and Systems I: Fundamental Theory and Applications, Volume: 49 Issue: 7, Page(s): 993-1000, (2002). Three most common encryption objects are block-encryption algorithms (private-key algorithms or symmetric algorithms), pseudo-random number generators (additive stream ciphers) and public-key algorithms (asymmetric algorithms).

Block ciphers transform a relatively short string (typically 64, 128 or 256 bits) to a string of the same length under control of a secret key. Several block encryption ciphers based on chaotic maps have been proposed, in which a discretization (process that describes the way a chaotic map is implemented in the computer) is not realized by rounding the chaotic map according to the computer arithmetic, but rather is constructed explicitly. Cryptographic systems are proposed to be based on chaotic permutations constructed by explicitly discretizing the two dimensional bakers map. Then, the ideas are extended to chaotic permutations on any size of two dimensional lattices. The permutations benefit from the expanding property along one axis, technically avoiding the contracting property along the other axis. A discrete version of the skew-tent map is proposed to exploit important chaotic properties, such as the sensitive dependence on initial conditions and the exponential information decay. They difference between the discretized map and the original map is discussed for explaining the ergodic-like and chaotic-like properties of the discretized map.

A pseudo-random number generator is a deterministic method, usually described with a mapping, to produce from a small set of random numbers, called the seed, and a larger set of random-looking numbers called pseudo-random numbers. Chaotic systems may be used to generate pseudo-random numbers. For example, a chaos is proposed to be derived from pseudo-random number generator. It is numerically observed that the average cycle and transient lengths grow exponentially with the precision of implementation, and thus it is deduced that using high-precision arithmetic one can obtain PRNGs which are still of cryptographic interest. Statistical properties of binary sequences generated by class of ergodic maps with some symmetrical properties are discussed to derive a sufficient condition for this class of maps to produce a sequence if independent and identically distributed binary random variables. However, the authors did not discuss the implementation of these maps on finite-state machines and the consequence this implementation may have on the randomness of the generated sequences.

Certain applications in cryptography require the use of a truly random number generator (RNG), which is a device that outputs a sequence of statistically independent and unbiased numbers. It is widely accepted that the core of any RNG must be an intrinsically random physical process. Thus, it is no surprise that the proposals and implementations of RNGs range from tossing a coin, to measuring thermal noise from a resistor and shot noise from a Zener diode or a vacuum tube, measuring radioactive decay from a radioactive source, and sampling a stable high-frequency oscillator with an unstable low-frequency clock, to mention only a few proposals.

Several applications of chaos in cryptography have been proposed. These applications usher in the era of scientific chaos-based cryptography, which will trigger more research and real-world applications of chaos-based data protection. For example, in European Patent Application No. 01130846.7 filed on Dec. 21, 2001, entitled "Chaos-based block encryption", a method for generating truly random numbers has been designed and implemented in CMOS technology. Random numbers are crucial importance in every encryption and data protection application. Block encryption algorithm based on chaotic maps are proposed in European Patent Application No. 01130846.7 filed on Dec. 27, 2001, entitled "Chaos-based data protection using time-discrete dynamical systems". Lower bounds of number of active S-boxes as well as the upper bounds for differential and linear probabilities in the proposed algorithm have been derived analytically, and therefore, the resistance of this algorithm to differential and linear attacks has been proved. European Patent Application No. 02425689.3 filed on Nov. 12, 2002, entitled "Method of generating a chaos-based pseudo-random sequence and a hardware generator of chaos-based pseudo random bit sequences" has presented a class of pseudo-random-bit generators, for which security does not rely on a number-theoretical problem, and therefore, does not use modular multiplications. In contrast, its security relies on the large numbers of branches for an inverse of a function used in the algorithm. The generators use only binary operations and have been efficiently implemented in software.

The article "Communication Theory of Secrecy Systems" by C. E. Shannon, published in 1949, ushered in the era of scientific secret-key cryptography. However, Shannon's article did not lead to an explosion of researches on cryptography comparable to that triggered by his earlier articles published in 1948 in information theory. The real explosion of works on cryptography came with an article entitled "New directions in cryptography" by W. Diffie and M. E. Hellman. Diffie and Hellman showed for the first time that a secret communication was possible without any transfer of a secret key between sender and recipient, thus starting the era of public-key cryptography. Moreover, they suggested that computational complexity theory could be used for future research in cryptography.

Substantially, an encryption process is a process for transmitting data in a mode that ensures that the data remain private, by converting a message, referred to as a plain-text, into an encrypted format, referred to as a cipher-text. A sender encrypts the message by using an encryption key, while the recipient of the message recovers the plain-text from the received cipher-text by using a decryption key. Public-key encryption algorithms, also called asymmetric algorithms, are designed so that (i) the encryption key is different from the decryption key; (ii) the encryption key can be made public; and (iii) the decryption key cannot, at least in a reasonable amount of time, be calculated from the encryption key. There are many public-key algorithms. Only a few of them are both secure and practical, and only three of them work well for both encryption and digital signature. In a public-key encryption system, each entity A has a public key "e" and a corresponding private key "d". In secure systems, the task of calculating the private key "d" from the public key "e" is practically impossible.

The public key defines an encryption transformation Ee, while the private key defines the associated decryption transformation Dd. A sender B wishing to send a message (plain-text) M to a recipient A must obtain an authentic copy of the recipient public key "e", use the encryption transformation to obtain the ciphertext c=Ee(M), and transmit the encrypted message "c" to the recipient A. The recipient A decrypts the ciphertext "c" using the decryption transformation and obtains the plain-text M=Dd(C).

Since 1976, numerous public-key algorithms have been proposed. Three most widely used public-key encryption processes are RSA, Rabin and ElGamal. The security of the ElGamal public-key encryption process is based on the intractability of the discrete-logarithm-problem. The security of the RSA process is based on the intractability of the integer factorization problem. Currently, for a secure RSA process to be executed a 1024-bit key has to be utilized. In the Rabin public-key encryption process, the problem faced by a passive adversary is computationally equivalent to factorizing a number. However, factorization has been an extensive field of research, and in May 2007 a 1024-bit number has been factorized. Thus, raising doubts on cryptosystems that depend on the difficulty of factorizing a 1024-bit key.

SUMMARY OF THE INVENTION

According to at least one embodiment of the present invention, a method and apparatus is provided for a chaotic asymmetric encryption system that is based on a mathematically proven chaotic dynamical system, the ergodic property of chaotic maps, conventional Diffie-Hellman key exchange procedure, a modified Diffie-Hellman key exchange procedure and a public key which is any number that could be chosen from the interval 0,1.

According to the present invention, the apparatus includes a computer device having a processor and a memory unit operateably connected to each other. In addition, the computer device may also include a storage device, input devices, display, network card and any other related components as generally known in the art. Residing within the memory unit is a key generation module that, once executed, generates an arbitrary Public Key from the interval 0,1. In contrast to other known cryptosystems, the key generation module generates an arbitrary Public Key from the interval 0,1 which is not restricted by any mathematical consideration other than it has to belong to the interval 0,1. This arbitrary number from the interval 0,1 is advantageous base on the fact that any number from the interval 0,1 still provides the same level of security which gives rise to the fact that a Public Key can be generated any number of times, thereby producing a dynamical cryptosystem if utilized optimally. This fact would eliminate the current practice of procuring key certificates provided by third parties. The present invention also provides a PC-implemented encryption/decryption process which is not restricted to a particular set of keys.

BRIEF DESCRIPTION OF THE DRAWINGS

Embodiments of the present invention are illustrated by way of example, and not by limitation, in the figures of the accompanying drawings, wherein elements having the same reference numeral designations represent like elements throughout and wherein.

DETAILED DESCRIPTION OF THE DRAWINGS

Figure 1:
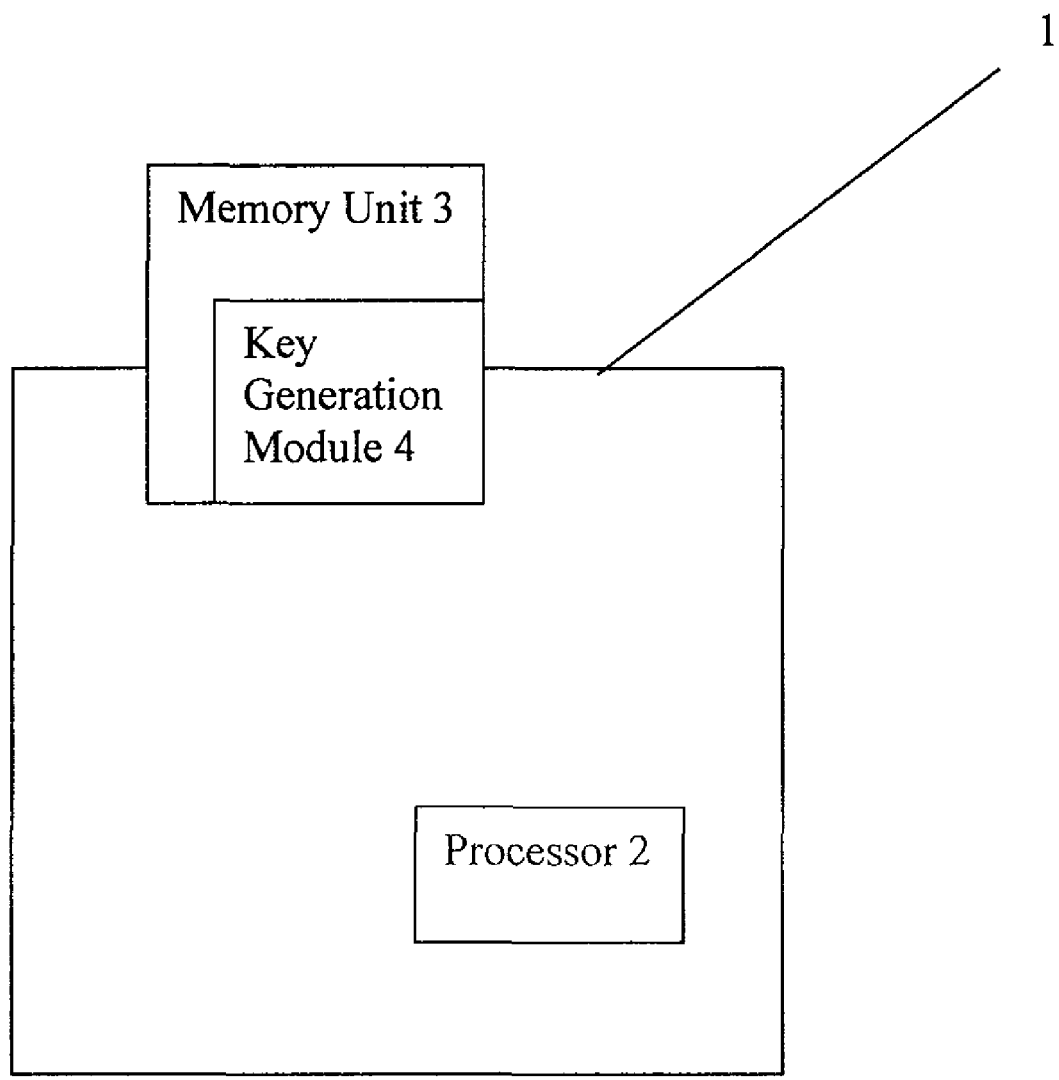
FIG. 1 shows a block diagram representation of an apparatus to implement cryptosystem according to the present invention.

Referring now to the figures, especially to FIG. 1, which shows an apparatus for the generation of a Public Key configured according to the embodiment of the present invention. In its configuration, the apparatus includes a computer device 1 having a processor 2 and a memory unit 3 operateably connected to each other. The apparatus of the present invention can be implemented in desktop or laptop personal computer (PC) in a stand-alone configuration and/or any mobile device connected to at least another PC through an on-line connection. In addition, the computer device 1 may also include a storage device (not shown), input devices such as a keyboard, CD-ROM etc. (not shown), display (not shown), network card (also not shown) and any other related components as generally known in the art. Residing within the memory unit 3 is a key generation module 4 that, once executed, generates an arbitrary Public Key from the interval 0,1. In contrast to other known cryptosystems, the key generation module 4 processes a true random or pseudo-random number generator to generate an arbitrary Public Key from the interval 0,1 which is not restricted by any mathematical consideration other than it has to belong to the interval 0,1. This arbitrary number from the interval 0,1 is advantageous base on the fact that any number from the interval 0,1 still provides the same level of security which gives rise to the fact that a Public Key can be generated any number of times, thereby producing a dynamical cryptosystem if utilized optimally. Also, this fact would eliminate the current practice of procuring key certificates provided by third parties. The present invention also provides a PC-implemented encryption/decryption process which is not restricted to a particular set of keys.

Figure 2:
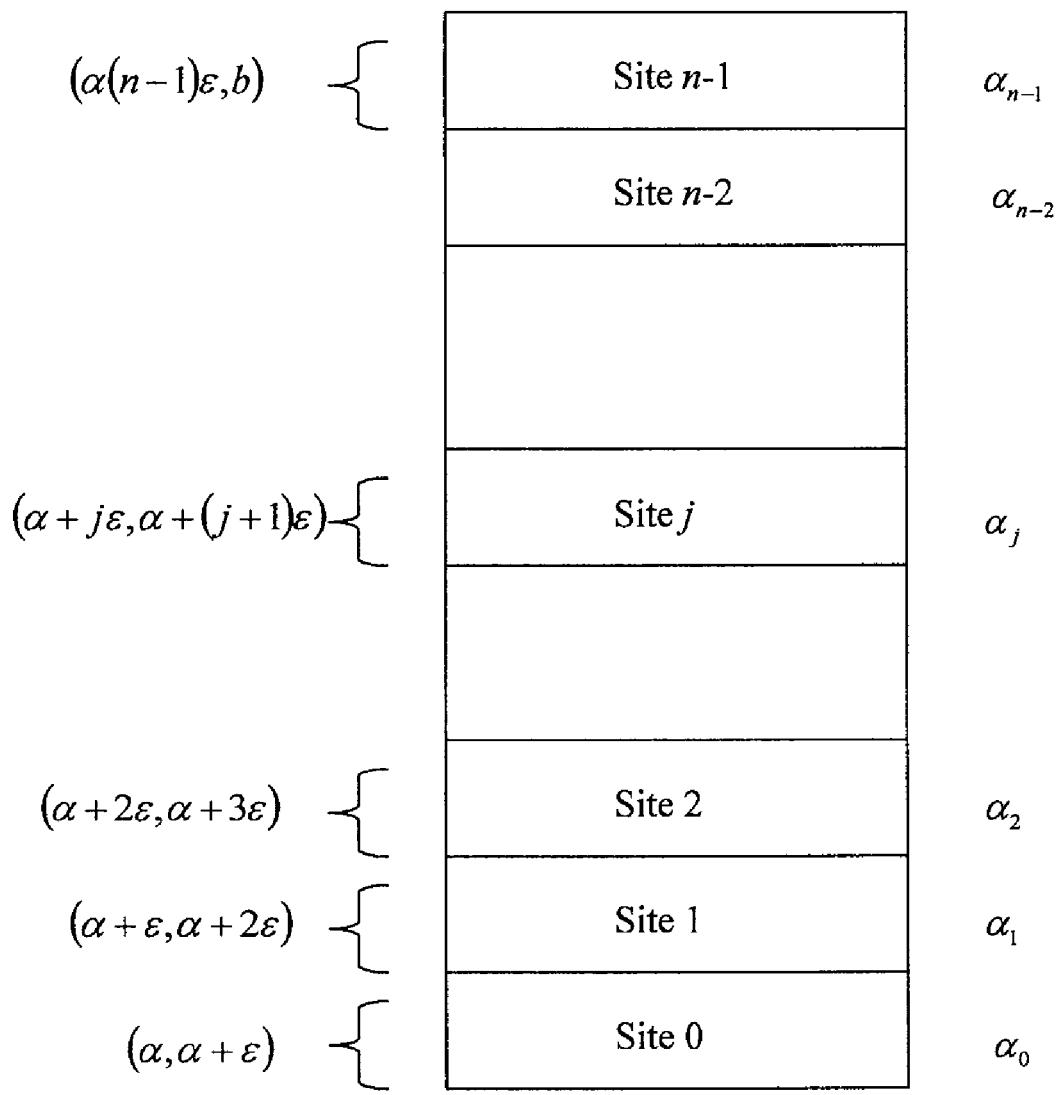
FIG. 2 shows a block diagram representation of a n-character 'alphabet' and their accompanying phase space A=a, b ⊂ 0,1.
Figure 3:
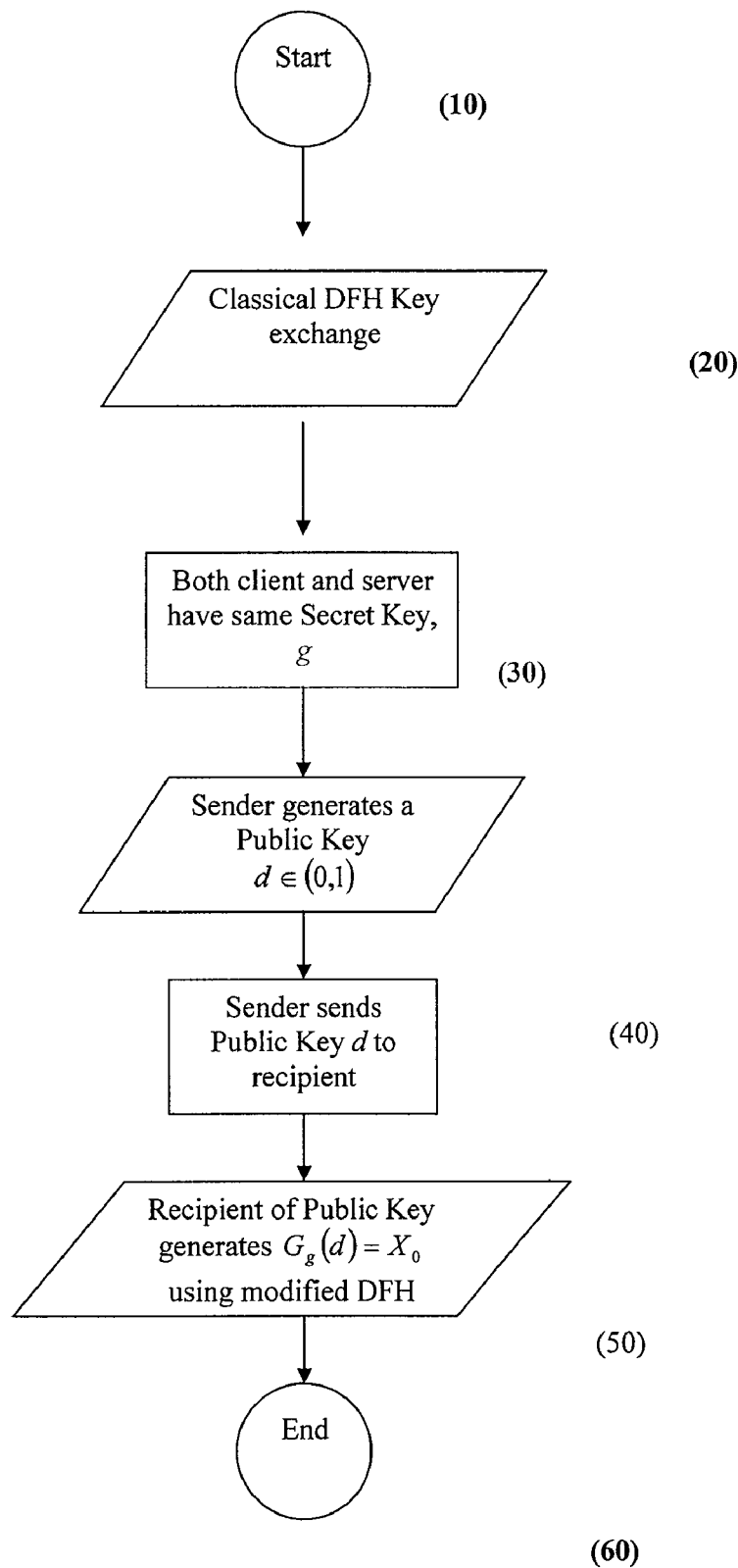
FIG. 3 shows a flow chart of the method for generating a Private Key.

Referring to FIG. 2, it shows a block diagram representation of a n-character 'alphabet' and their accompanying phase space $A=(a,b) \subset (0,1)$. For $j=0, 1, 2, \ldots, n-1$, let the phase space for each alphabet $\alpha_0, \alpha_1, \ldots, \alpha_{n-1}$, is $(a+j\epsilon, a+(j+1)\epsilon \subset (a,b)$ respectively. FIG. 3 shows a flow chart representing the process to generate a Private Key ($X_0$) according to the invention. As indicated earlier, an arbitrary number from the interval $(0, 1)$ is chosen as the Public Key (d), and then transformed by the Recipient of the Public Key (d) into a Private Key ($X_0$) by this method. Referring to FIG. 3, the process starts at START step (10). The Diffie-Hellman key exchange procedure is executed in step (20), and the detailed Diffie-Hellman key exchange procedure is disclosed in U.S. Pat. No. 4,200,770, incorporated herein by reference. To illustrate this process, in step (40) the Sender generates the inputted Public Key (d) randomly selected from $Pb=0.b_1 b_2 \ldots b_m$, where $b_i$ is any integer between 0 and 9 and m is an integer referring to the precision a user would pre-define. This Public Key (d) is then subjected to a transformation process based on the Secret Key (g) obtained from the conventional Diffie-Hellman key exchange procedure in step (20). A true random number generator can be utilized to generate the secret key for the conventional Diffie-Hellman key exchange procedure and to generate an arbitrary Public Key from the interval (0,1). The outcome of these two processes will be denoted by B and C. The Secret Key (g) will be exponentiated by the Public Key (d) and the value given to the variable B, where $B \leftarrow g^{Pb}$, and then calculate the value B real modular Pb and the value given to C, where $C \leftarrow B(r \text{ mod } Pb)$. The parameter C is now the Private Key ($X_0$) and is now ready to be used as the initial value for the chaotic cryptosystem.

Both client and server acquire an identical 1024 bit Secret Key (g) in step (30). Sender generates Public Key (a) in the interval (1, 0) in step (40), and then sends the Public Key (d) to Recipient in step (50). In step (60), by utilizing the Secret Key (g) and the proprietary real modular definition, the Private Key ($X_0$) is produced. The encryption system utilizes the modified Diffie-Hellman scheme whose strength is inherited from the time tested discrete-logarithm problem of the conventional Diffie-Hellman scheme which is computably unfeasible to solve. For the proprietary real modular definition, Let a and b be real numbers, we say that a congruence to b modulo real number r if $a-b=k \cdot r$, for some $k \in Z$. We denote to the modulus of real numbers by rmod and we write $a \equiv b(\text{rmod } r)$.

Let g be the secret key transmitted between Alice and Bob via the Diffie-Hellman key exchange procedure. Choose an arbitrary number $d \in (0,1)$, the modified Diffie-Hellman scheme is given by $$G_g(d) = g_d(r \text{ mod } d)$$

The Private key ($X_0$) is obtained as ($X_0$)=$G_g(d)$, and the strength of $G_g(d)$ is inherited directly from g.

Figure 4:
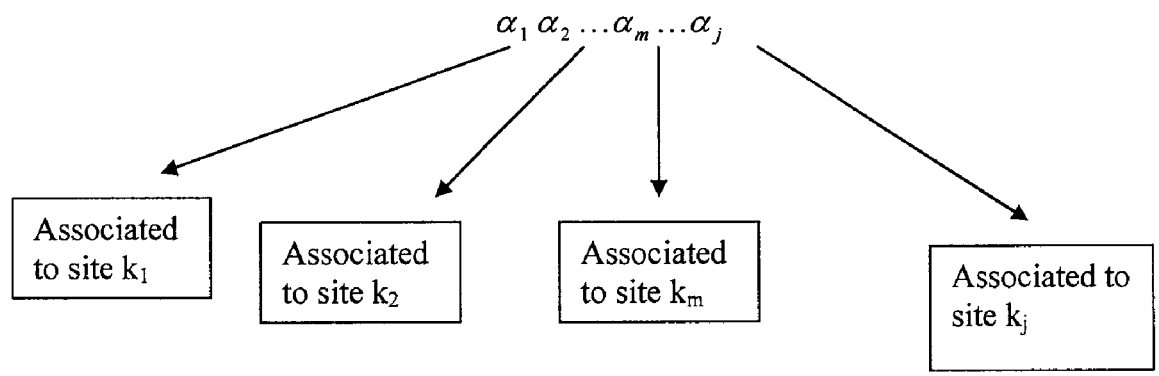
FIG. 4 shows a diagram of the method of encryption according to the invention.

Referring to FIG. 4 now, it shows a diagram which describes the process of encryption according to the invention. Considering the plaintext consisting of j-characters as shown in FIG. 4, we can encrypt as follows ($X_0$ is the initial condition obtained from FIG. 3):

$F^C_1(X_0) = X_{0,1} \; X_{0,1}$ belongs to the $k_1$. the cipher for $\alpha_1$ is $C_1$.

$F^C_2(X_{0,1}) = X_{0,2} \; X_{0,2}$ belongs to the side $k_2$. The cipher for $\alpha_2$ is $C_2$.

$F^C_m(X_{0,m-1}) = X_{0,m} \; X_{0,m}$ belongs to the site $k_m$. The cipher for $\alpha_m$ is $C_m$.

$F^C_j(x_{0,j-1}) = X_{0,j} \; X_{0,j}$ belongs to the site $k_j$. The cipher for $\alpha_j$ is $C_j$.

Where $C_m$ is the minimum number of iterations needed to reach the corresponding site: $N_0 \leq C_m \leq 65532$.

By utilizing the ergodicity property of chaotic maps, we iterate the chaotic map t number of times until the map falls in the phase space designated for a particular element in the plaintext. The ciphertext is the number of iterations t. For the encryption system based on the ergodic property of a chaotic system, different codes can be provided for the same character even in the same encryption process. Now consider the following ciphertext:

$$C_1 C_2 \ldots C_m \ldots C_j$$

We start with iterating $X_0$ $F^C_1(X_0) = X_{0,1} \; X_{0,1}$ belongs to the site $k_1$. Corresponding character is $\alpha_1$.

$F^C_2(X_{0,1}) = X_{0,2} \; x_{0,2}$ belongs to the site $k_2$. Corresponding character is $\alpha_2$.

$F^C_m(X_{0,m-1}) = X_{0,m} \; X_{0,m}$ belongs to the site $k_m$. Corresponding character is $\alpha_m$.

$F^C_j(X_{0,j-1}) = X_{0,j} \; X_{0,j}$ belong s to the site $k_j$. Corresponding character is $\alpha_j$.

Finally we get back the plaintext:

$$\alpha_1 \alpha_2 \ldots \alpha_m \ldots \alpha_j$$

Accordingly, by iterating the chaotic map using information received via the ciphertext (which consists of the number of iterations) the chaotic map will arrive at the designated phase space, and indicating the correct plaintext element. Accordingly, a user is provided with an infinite choice of numbers to choose as the Public Key, and a Public Key can be any number generated arbitrarily from the interval (0,1) and submitted over an insecure channel.

According to the above detailed description for the embodiment of the invention, the present invention provides an apparatus and method for data encryption via the asymmetric encryption concept. The apparatus and method of the present invention utilizes the ergodicity property of chaotic dynamical systems, whereby its final state is unpredictable such that a small change in the initial condition of a chaotic system can cause a substantial difference in the predicted outcome or final state. Therefore, the recovery of an initial state of a chaotic system is computationally infeasible by, for example, reversing the iterations used to arrive at the final condition.

The present invention also provides a PC-implemented encryption/decryption process which is not restricted to a particular set of keys. A user is provided with an infinite choice of numbers to choose as the Public Key. A Public Key can be any number generated arbitrarily from the interval 0,1 and submitted over an insecure channel. The PC-implemented encryption/decryption process according to the present invention utilizes the modified Diffie-Hellman scheme such that the submission of the Public Key over an insecure channel would not compromise the Private Key associated with it. The Private Key is generated as the initial value of a chaotic map, and the ciphertext of the plaintext are integer numbers referring to the number of iterations needed to arrive at some phase space for the corresponding character.

It will be readily seen by one of ordinary skill in the art that one or more embodiments according to the present invention fulfill one or more of the objects set forth above. After reading the foregoing specification, one of ordinary skill will be able to affect various changes, substitutions of equivalents and various other embodiments of the invention as broadly disclosed herein. It is therefore intended that the protection granted hereon be limited only by the definition contained in the appended claims and equivalents thereof.

The invention claimed is:

1. An apparatus for the generation of Public Key and Private Key for use in association with encryption and decryption of digital data, the apparatus comprising:
a processor; and
a memory unit having a key generation module, wherein the key generation module processes a random or pseudo-random number generator to generate the Public Key of a number in the interval 0,1, and wherein the associated encryption and decryption process utilizes an ergodic property of a chaotic map as a ciphertext of a message corresponding to a number of iterations of the chaotic map to arrive at the phase space allocated for a certain character.

2. An apparatus as claimed in claim 1, wherein the apparatus is implemented in a PC having the key generation module residing in its memory.

3. An apparatus as claimed in claim 2, wherein the PC is in a stand-alone configuration.

4. An apparatus as claimed in claim 1, wherein the apparatus is implemented in a mobile device connected to at least another PC through an on-line connection.

5. A method for generating a Public Key and a Private Key for use in association with encryption and decryption of digital data comprising the steps of:
providing a key generation module in a memory unit of a computer device having at least a processor;
generating from the key generation module a random number in the interval 0,1 to be the Public Key (d);
deriving a Secret Key (g) via the conventional Diffie-Hellman key exchange procedure;
exponentiating the Secret Key (g) by the Public Key (d) to obtain a variable B, where $B \leftarrow p^b$; and
calculating the value B real modular Pb to obtain a parameter given to C, where $C \leftarrow Br \mod Pb$, wherein the parameter C is now the Private Key ($X_0$) to be used as the initial value of a predetermined chaotic map to begin the encryption process for the chaotic cryptosystem.

6. A method as claimed in claim 5, wherein the encryption process method utilizes the ergodic property of the predetermined chaotic map as the ciphertext of the message corresponding to the number of iterations of the predetermined chaotic map to arrive at the phase space allocated for a certain character.

7. A method as claimed in claim 5, wherein the encryption system provides different codes for a same character even in a same encryption process.

8. A method as claimed in claim 5, wherein the recipient of the ciphertext has only to iterate the chaotic map according to the integers provided via the ciphertext from the sender to arrive at the phase space of the intended character.

9. A method as claimed in claim 5, wherein the encryption system utilizes a modified Diffie-Hellman scheme that employs the discrete logarithm problem of the conventional Diffie-Hellman scheme to solve to prevent unauthorized decryption.

* * * * *